United States Patent
Kim et al.

(10) Patent No.: US 10,871,222 B2
(45) Date of Patent: Dec. 22, 2020

(54) ELECTRONIC SHIFT CONTROL DEVICE

(71) Applicant: KYUNG CHANG INDUSTRIAL CO., Ltd., Daegu (KR)

(72) Inventors: Dong Won Kim, Daegu (KR); Yong Soo Kang, Daegu (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 132 days.

(21) Appl. No.: 16/198,555

(22) Filed: Nov. 21, 2018

(65) Prior Publication Data
US 2019/0219165 A1 Jul. 18, 2019

(30) Foreign Application Priority Data
Jan. 16, 2018 (KR) .................. 10-2018-0005339

(51) Int. Cl.
*F16H 61/24* (2006.01)
*F16H 59/02* (2006.01)
(Continued)

(52) U.S. Cl.
CPC ......... *F16H 61/24* (2013.01); *F16H 59/0204* (2013.01); *F16H 59/044* (2013.01); *F16H 59/08* (2013.01); *F16H 2059/026* (2013.01); *F16H 2059/0295* (2013.01); *F16H 2059/047* (2013.01); *F16H 2061/247* (2013.01)

(58) Field of Classification Search
CPC ............... F16H 61/24; F16H 2059/026; F16H 2059/0295; F16H 2059/047; F16H 2061/247
See application file for complete search history.

(56) References Cited

U.S. PATENT DOCUMENTS 6,443,024 B1 * 9/2002 Skogward ........... F16H 59/0204
74/473.18
2016/0040778 A1 * 2/2016 Magrini ................. F16H 63/38
74/473.15

FOREIGN PATENT DOCUMENTS

CN 104943540 A 9/2015
CN 105393027 A 3/2016
(Continued)

OTHER PUBLICATIONS

China National Intellectual Property Administration, First Office Action, CN Patent Application No. 201811418883.2, dated Mar. 24, 2020, 11 pages.

*Primary Examiner* — Vicky A Johnson
(74) *Attorney, Agent, or Firm* — Fenwick & West LLP

(57) ABSTRACT

An electronic shift control device includes: a shift slider which is movable in a shift direction; a shift body under the shift slider and is movable according to the movement of the shift slider; and a bracket which is arranged under the shift slider and receives the shift body. The shift body includes elastic member receiving grooves and hinge protrusions. A hinge elastic member supporting the shift body is in the elastic member receiving groove. The bracket includes a hinge protrusion recess receiving the hinge protrusion. The shift slider is located at a reference position, and when the shift slider moves from the reference position in the shift direction, the hinge protrusion moves along the hinge protrusion recess, and a shift stage is changed, and the shift slider which has moved in the shift direction returns to the reference position by an elastic restoring force of the hinge elastic member.

10 Claims, 13 Drawing Sheets

(51) Int. Cl.
*F16H 59/04* (2006.01)
*F16H 59/08* (2006.01)

(56) References Cited

FOREIGN PATENT DOCUMENTS

| | | | |
|---|---|---|---|
| KR | 10-2007-0079439 A | 8/2007 | |
| KR | 10-2009-0131500 A | 12/2009 | |
| KR | 10-2010-0083981 A | 7/2010 | |
| KR | 101341131 B1 * | 12/2013 | ............ F16H 61/24 |
| KR | 10-2016-0026063 A | 3/2016 | |
| WO | WO-2019201675 A1 * | 10/2019 | ........... F16H 59/105 |

* cited by examiner

Fig. 7
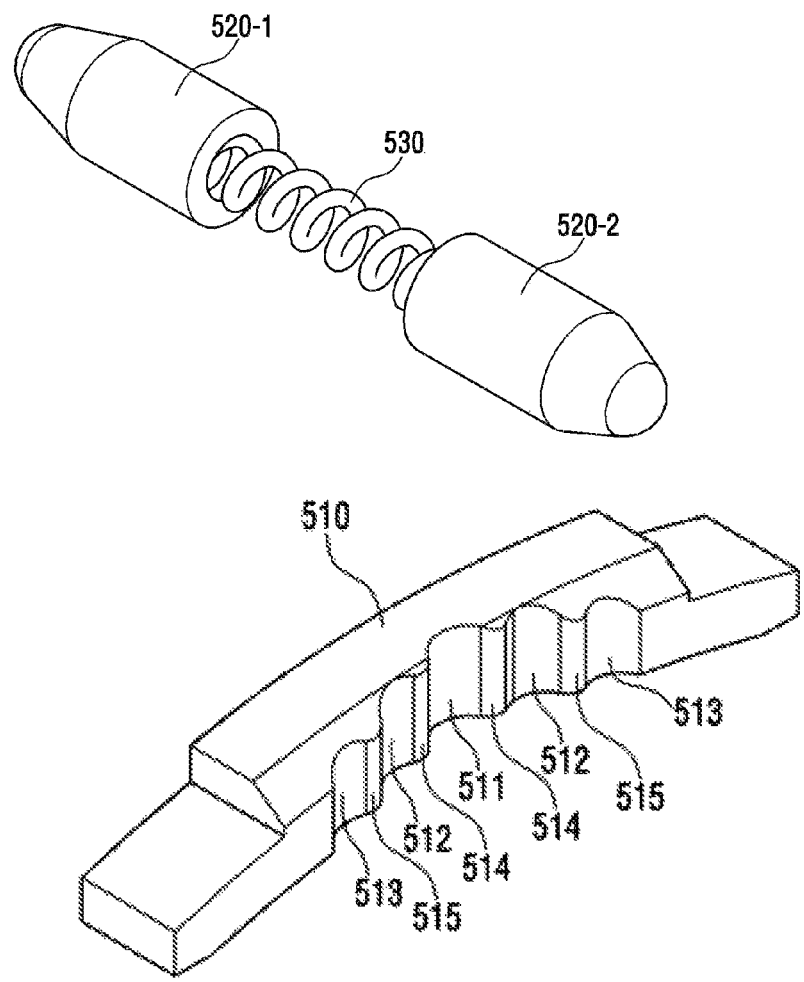
Fig. 8A
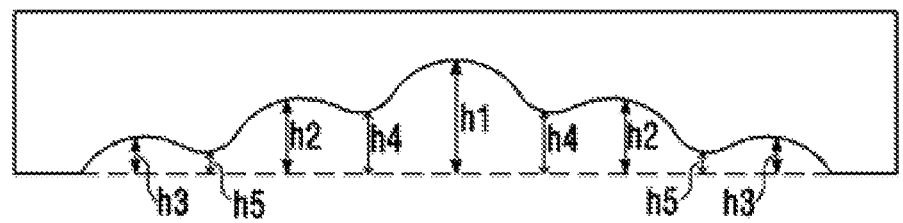
Fig. 8B

ELECTRONIC SHIFT CONTROL DEVICE

CROSS-REFERENCE TO RELATED APPLICATIONS

This application claims the benefit of the Republic of Korea Patent Application No. 10-2018-0005339, filed on Jan. 16, 2018, which is hereby incorporated by reference in its entirety.

BACKGROUND

Field

The present disclosure relates to a shift control device and more particularly to an electronic shift control device which is capable of changing a shift stage into a user-desired shift stage by using a shift slider movable in a shift direction.

Description of the Related Art

In general, a transmission converts the power generated by an engine into a rotational force required according to the speed of a vehicle and transmits it to the drive wheel. The transmission is divided into a manual transmission and an automatic transmission. A driver who drives a vehicle can change the shift stage of the manual transmission or automatic transmission into a shift stage that the driver wants by manipulating a console side around the driver seat or a shift lever installed on the steering wheel.

The manual transmission is operated in such a way that when a driver selects a gear suitable for the driving condition of the vehicle by using the shift lever, the driver-desired movement is transmitted to the transmission through a cable or rod. The automatic transmission is operated in such a way that the driver moves the shift lever to drive an inhibitor switch through the cable, so that the driver-desired movement is transmitted to the transmission.

Recently, instead of a mechanical shift lever, an electronic shift lever in which a mechanical connection structure between the transmission and the shift lever has been replaced with an electric connection structure through an actuator and ECU are increasingly being used. Unlike the mechanical shift lever, the electronic shift lever has no mechanical cable connection structure and should include a position sensor that converts the shift intention of the driver into an electronic signal. However, the electronic shift lever has excellent lever operation power or excellent operation feeling and is easy to operate.

This electronic shift lever has a stick type, a dial type, a button type, etc. Particularly, the stick type electronic shift lever has a structure in which the driver holds and operates the shift lever. In the stick type electronic shift lever, the shift lever and inside many parts are connected in a complicated manner, so that the structure of the stick type electronic shift lever is difficult to design.

SUMMARY

An object of the present disclosure is to provide an electronic shift control device which is small and has high space utilization.

Another object of the present disclosure is to provide the electronic shift control device which is lightweight due to a small number of parts thereof and is simply assembled by simplifying the configuration of the parts.

However, the object of the present disclosure is not limited to the above description and can be variously extended without departing from the scope and spirit of the present invention.

One embodiment is an electronic shift control device including: a shift slider which is movable in a shift direction by an operation of a user; a shift body which is arranged under the shift slider and is movable according to the movement of the shift slider; and a bracket which is arranged under the shift slider and receives the shift body. The shift body includes a plurality of elastic member receiving grooves and a plurality of hinge protrusions. A hinge elastic member supporting the shift body is arranged in the elastic member receiving groove. The bracket includes a hinge protrusion recess receiving the hinge protrusion. The shift slider is located at a predetermined reference position, and when the shift slider moves from the reference position in the shift direction in accordance with the operation of the user, the hinge protrusion moves along the hinge protrusion recess, and then a shift stage is changed, and the shift slider which has moved in the shift direction returns to the reference position by an elastic restoring force of the hinge elastic member.

According to the embodiment, the shift body includes: a shift slider contacting part which contacts the shift slider; a bullet seating part which is formed under the shift slider contacting part in a direction perpendicular to the shift direction; a hinge which is formed under the bullet seating part and includes the plurality of elastic member receiving grooves and the plurality of hinge protrusions; and a magnet seating part which is formed in a lower portion of the hinge.

According to the embodiment, the electronic shift control device further includes a detent system. The detent system includes: a bullet elastic member which is disposed in the bullet seating part; a bullet which is disposed on one side and the other side of the bullet elastic member respectively and is elastically supported by the bullet elastic member; and a groove which is fixedly arranged in one upper side surface and the other upper side surface of the bracket respectively and which the bullet contacts. The shift slider returns to the reference position by an elastic restoring force of the bullet elastic member after the shift stage is changed by moving the shift slider in the shift direction.

According to the embodiment, one surface of the groove includes a plurality of catching recesses and projections formed between the plurality of catching recesses. Depths of the plurality of catching recesses increase toward the middle from the edge thereof. The depth of the catching recess is a distance from the one surface of the groove to a lowest point of the catching recess.

According to the embodiment, the reference position is a position where the bullet is received in contact with one catching recess located in the middle among the plurality of catching recesses.

According to the embodiment, the plurality of elastic member receiving grooves are formed to protrude or extend from a first side surface and a second side surface of the hinge respectively in the shift direction. The second side surface is opposite to the first side surface.

According to the embodiment, the bracket further includes a guide recess formed in one side surface and the other side surface of the bracket respectively. The guide recess is formed such that the guide recess receives the elastic member receiving groove to enable the elastic member receiving groove to move.

According to the embodiment, the electronic shift control device further includes a shift stage sensor. The shift stage sensor includes: a magnet which is disposed in the magnet seating part; and a sensor which senses a magnetic field of the magnet and is disposed within a lower side surface of the bracket in such a manner as to correspond to the magnet.

According to the embodiment, the plurality of hinge protrusions are formed to protrude or extend from a third side surface and a fourth side surface of the hinge respectively in the direction perpendicular to the shift direction. The fourth side surface is opposite to the third side surface.

According to the embodiment, a roller is disposed on the hinge protrusion. The roller is disposed in a hinge protrusion recess.

According to the embodiment, the hinge protrusion recess is formed in one side surface and the other side surface of the bracket respectively and is formed to enable the hinge protrusion to move.

The electronic shift control device according to the embodiment of the present invention is small and has excellent space utilization Since a smaller number of parts constitute the shift control device, the electronic shift control device is light. Also, the shift control device is simply assembled by simplifying the configuration of the parts.

Also, the electronic shift control device has a small number of parts, and thus, the manufacturing cost thereof can be reduced. Also, the shift control device is simply assembled, and thus, the manufacturing time thereof can be reduced.

Also, the user can select the shift stage only by means of simple operation.

However, the effect of the embodiment of the present disclosure is not limited to the effects described above and can be variously modified without departing from the spirit and scope of the present invention.

BRIEF DESCRIPTION OF THE DRAWINGS

FIG. 7 is a view showing the arrangement of a bullet and a bullet elastic member shown in FIG. 4 according to an embodiment of the present disclosure;

FIGS. 8A and 8B are views showing a groove shown in FIG. 4 according to an embodiment of the present disclosure;

DETAILED DESCRIPTION

Embodiments of the present invention will be described in more detail with reference to the accompanying drawings. In the components of the present invention, detailed descriptions of what can be clearly understood and easily carried into practice through prior art by those skilled in the art will be omitted to avoid making the subject matter of the present invention unclear.

Hereinafter, an electronic shift control device according to the embodiment of the present invention will be described.

Figure 1:
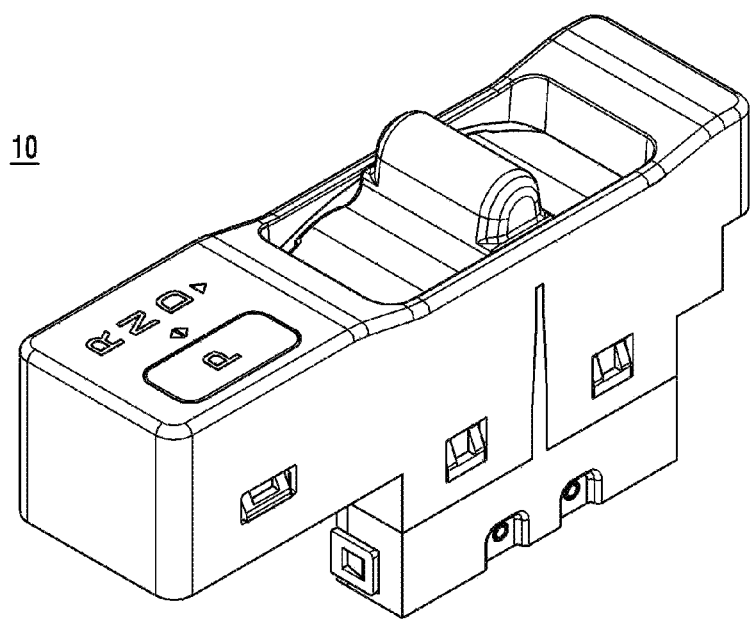
FIG. 1 is a perspective view showing an electronic shift control device according to an embodiment of the present disclosure.
Figure 2A:
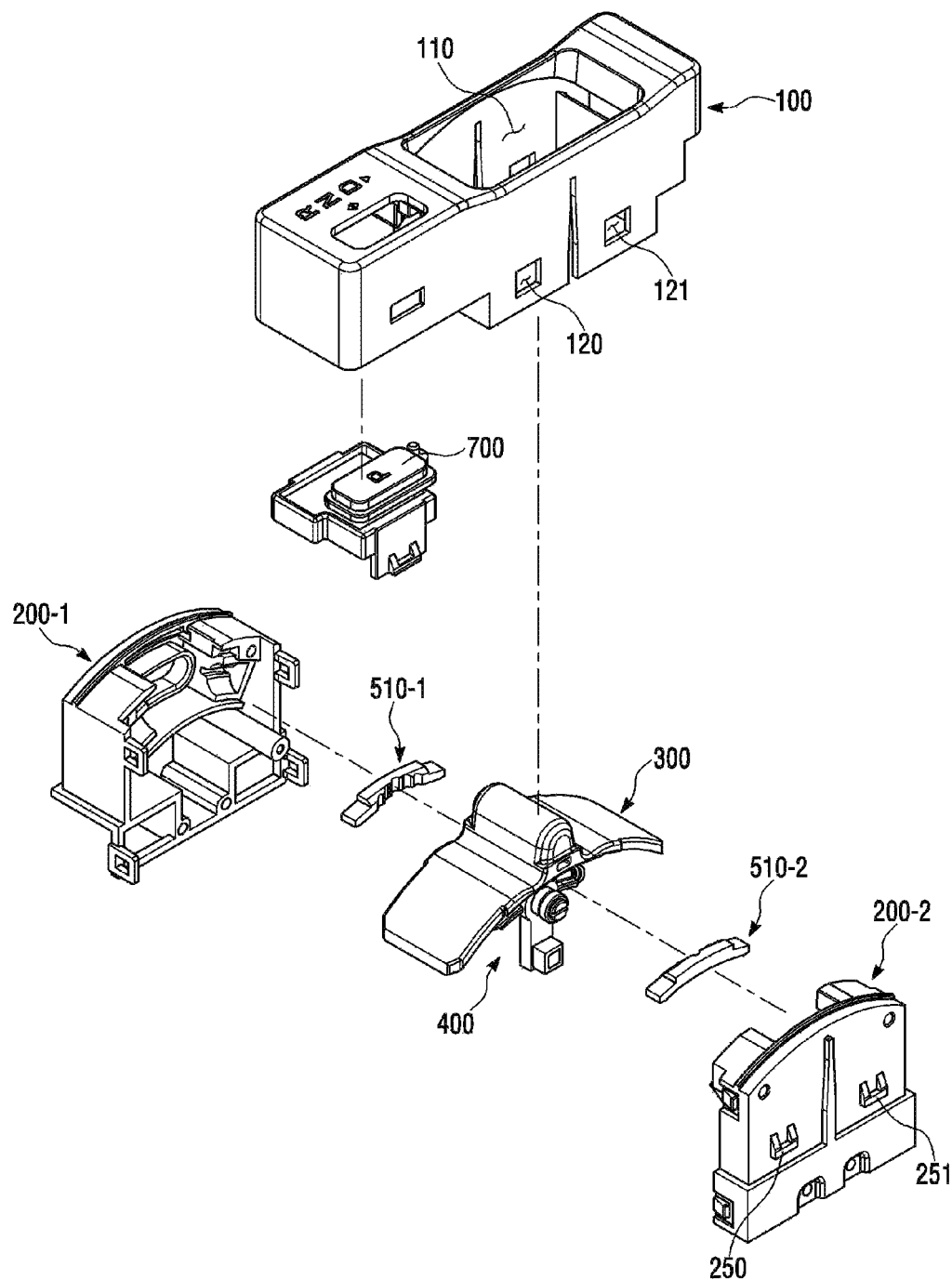
FIGS. 2Aa to 2B are exploded perspective views of the electronic shift control device shown in FIG. 1 according to an embodiment of the present disclosure.
Figure 2B:
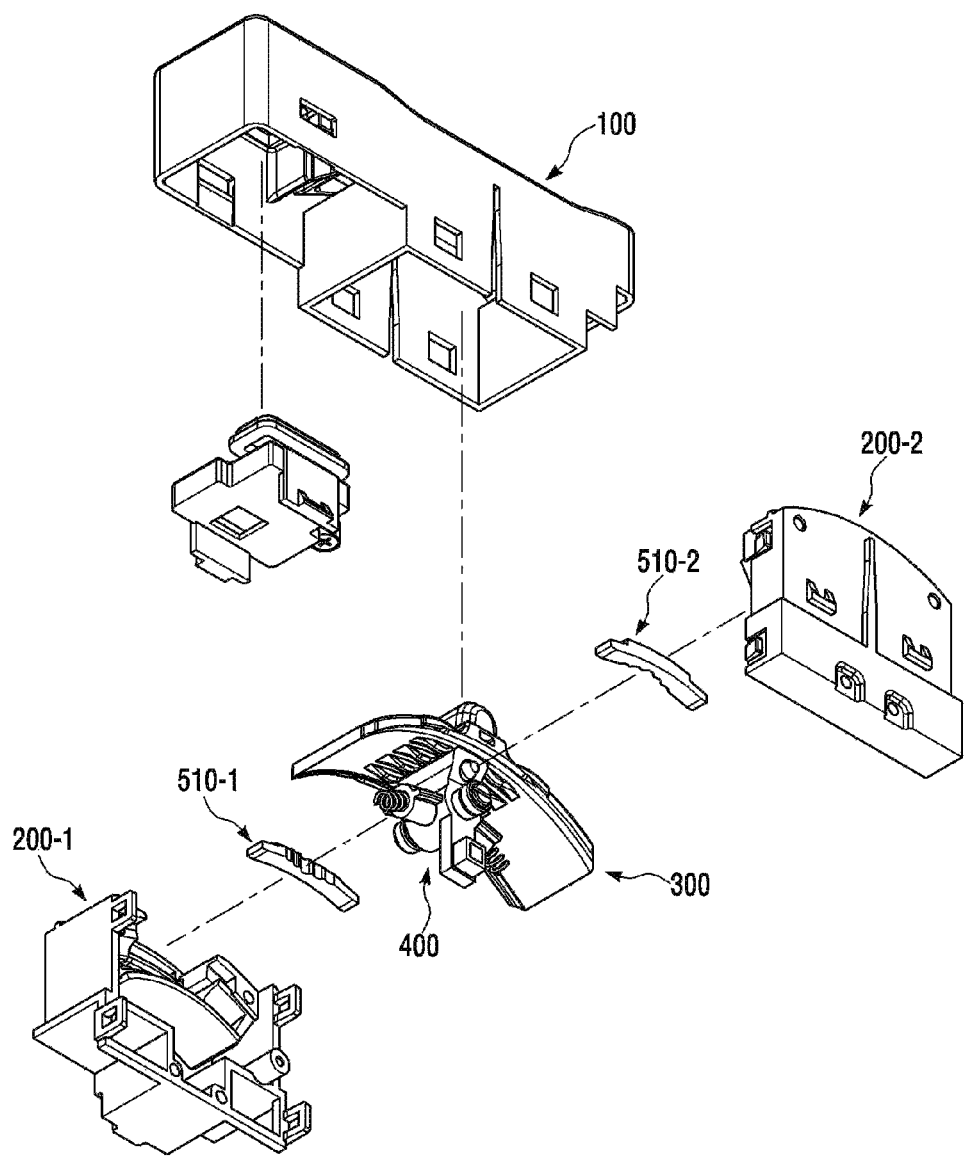

FIG. 1 is a perspective view showing the electronic shift control device according to the embodiment of the present disclosure. FIGS. 2A to 2B are exploded perspective views of the electronic shift control device shown in FIG. 1.

Referring to FIGS. 1, 2A, and 2B, the electronic shift control device 10 according to the embodiment of the present disclosure may include a shift slider 300, a shift body 400, and a bracket 200. Also, the electronic shift control device 10 according to the embodiment of the present invention may further include a housing 100, a detent system, and a shift stage sensor. Hereinafter, each of the components will be described in detail.

<Housing 100>

The housing 100 forms the exterior of the electronic shift control device according to the embodiment of the present disclosure.

The housing 100 is installed within the vehicle and has an interior space for receiving various components of the shift control device for shifting.

A hole 110 formed on the top surface of the housing 100 is connected to the interior space of the housing 100. Below-described operation part 310 and a portion of a below-described wing part 320 of the shift slider 300 may be exposed to the outside through the hole 110 formed on the top surface of the housing 100.

The housing 100 may be coupled to the below-described bracket 200. Specifically, the bracket 200 may be inserted into and coupled to the lower portion of the housing 100. A plurality of protrusions 250 and 251 formed on the side surface of the bracket 200 are inserted into and caught by a plurality of openings 120 and 121 formed in the side surface of the housing 100, and thus, they can be coupled to each other. The protrusions 250 and 251 caught by the openings 120 and 121 can prevent the housing 100 from being separated from the bracket 200 in a state where there is no external force. In addition to this, the housing 100 and the bracket 200 can be coupled to each other in various ways. For example, a protrusion is formed on the inner surface of the housing 100 and an opening is formed on the side surface of the bracket 200. Here, the protrusion is caught in the opening, so that they are coupled to each other.

The shape of the housing 100 is not specially determined. The housing 100 may have various shapes to which various components constituting the electronic shift control device according to the embodiment of the present invention can be fixed and coupled.

<Shift Slider 300>

Figure 3A:
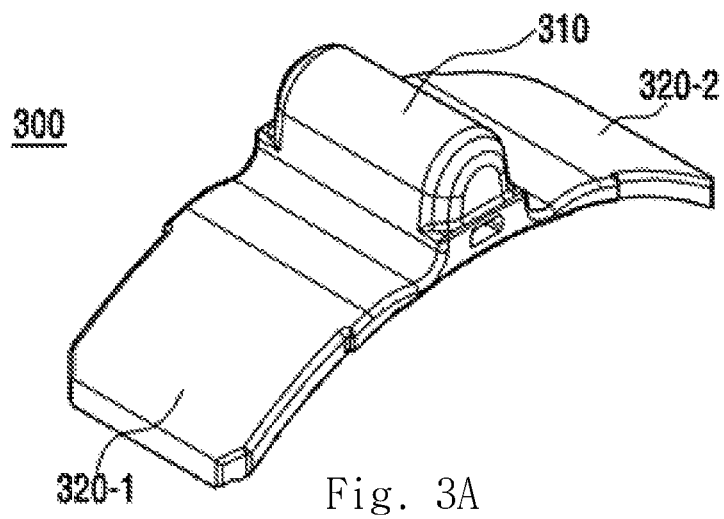
FIGS. 3A, 3B, and 3C are views showing a shift slider shown in FIG. 2 according to an embodiment of the present disclosure.
Figure 3B:
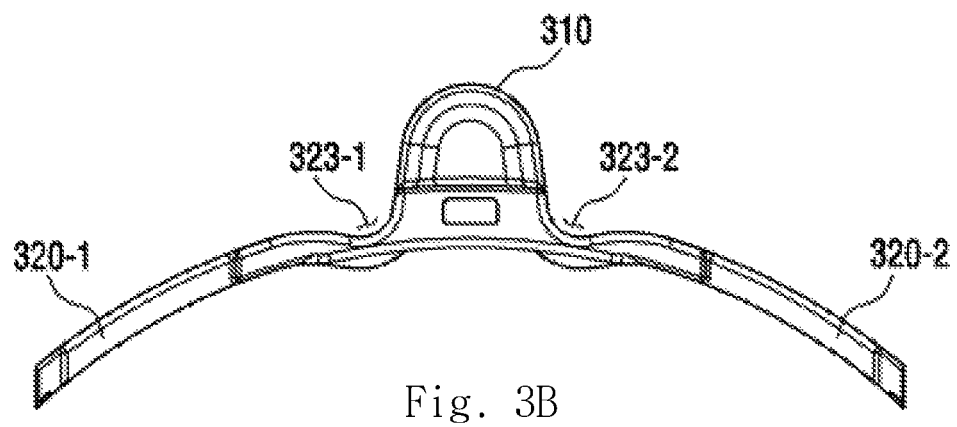
Figure 3C:
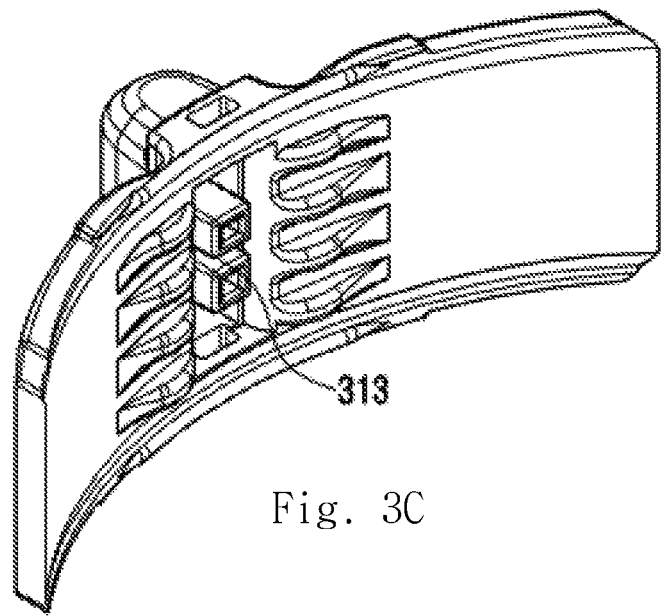

FIG. 3 is a view showing the shift slider shown in FIG. 2. A top perspective view of the shift slider is shown in FIG. 3A. A front view of the shift slider is shown in FIG. 3B. A bottom perspective view of the shift slider is shown in FIG. 3C.

Referring to FIG. 3, the shift slider 300 can move in a shift direction by the operation of a user. The shift direction represents a movement direction toward the shift stage and means a direction in which the shift slider 300 can move.

The shift slider 300 may include the operation part 310 and the wing part 320 and may be formed in the form of a circular arc. The operation part 310 may be formed to protrude from the center of the circular arc shape. The wing part 320 may be formed to extend from both sides of the operation part 310 and may have a circular arc shape. The user can select the shift stage by pushing or pulling the operation part 310.

The operation part 310 is operated by the user. The operation part 310 may be formed to protrude such that the finger of the user is caught therein. Recesses 323-1 and 323-2 may be formed between the operation part 310 and the wing parts 320-1 and 320-2 such that the user can easily hold the operation part 310.

Since the operation part 310 is formed to protrude from the center of the circular arc shape, a groove 313 may be formed in the bottom surface of the operation part 310. The below-described shift body 400 may contact the groove 313 formed in the bottom surface of the operation part 310. Specifically, a shift slider contacting part 410 of the shift body 400 may be inserted into and contact the groove 313 formed in the bottom surface of the operation part 310.

According to the embodiment of the present disclosure, various components that can contact (can be fastened to) the shift slider contacting part 410 may be formed in the groove 313 formed in the bottom surface of the operation part 310. For example, one or more protrusions may be formed in the groove 313 formed in the bottom surface of the operation part 310 in the direction of the shift body 400 arranged under the shift slider 300, and one or more grooves capable of receiving the one or more protrusions may be formed on the top surface of the shift slider contacting part 410.

When the user pushes or pulls the operation part 310, the shift slider contacting part 410 of the shift body 400, which has been inserted into and has contacted the groove 313 formed in the bottom surface of the operation part 310, moves. Therefore, the shift body 400 can move according to the movement of the shift slider 300.

The wing part 320 may be formed in the form of a circular arc such that, when the user pushes or pulls the operation part 310 in the shift direction, the shift slider 300 moves smoothly accordingly. However, the shape of the wing part 320 is not limited to this. The shape of the wing part 320 can be variously determined in such a way that the user can easily operate the shift slider 300.

<Shift Body 400>

Figure 4:
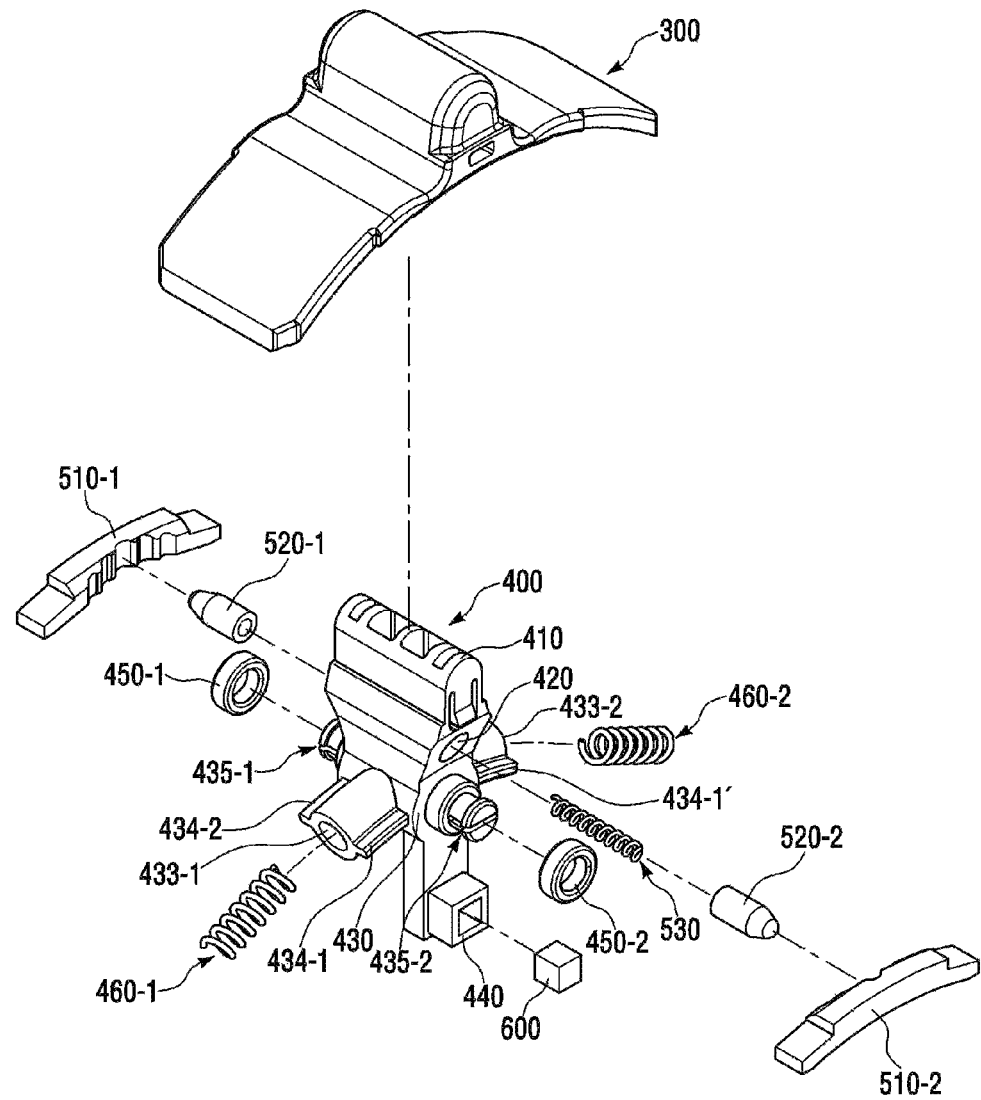
FIG. 4 is a view showing a shift body assembly and the shift slider shown in FIG. 2 according to an embodiment of the present disclosure.
Figure 5A:
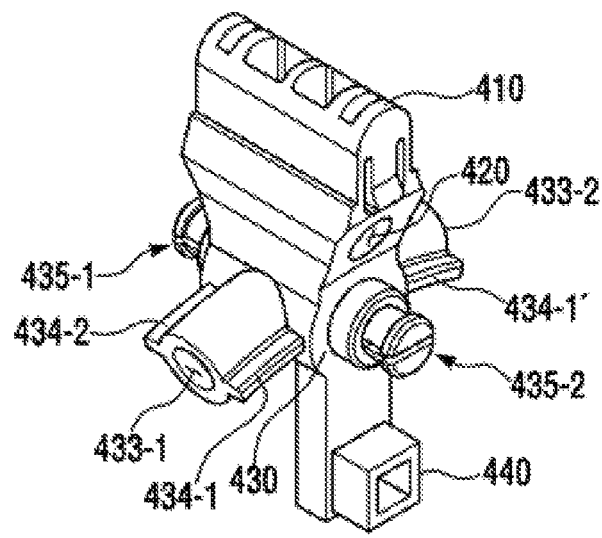
FIGS. 5A, 5B, and 5C are views showing a shift body shown in FIG. 2 according to an embodiment of the present disclosure.
Figure 5B:
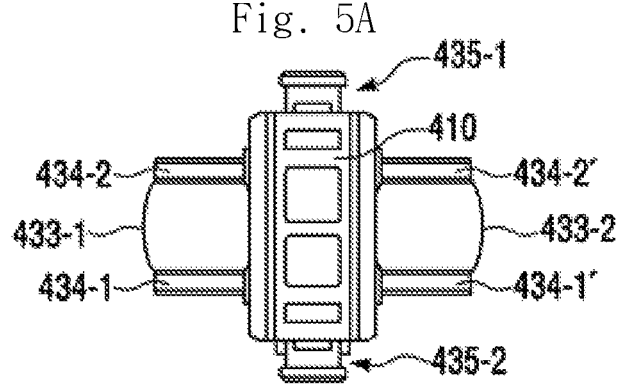
Figure 5C:
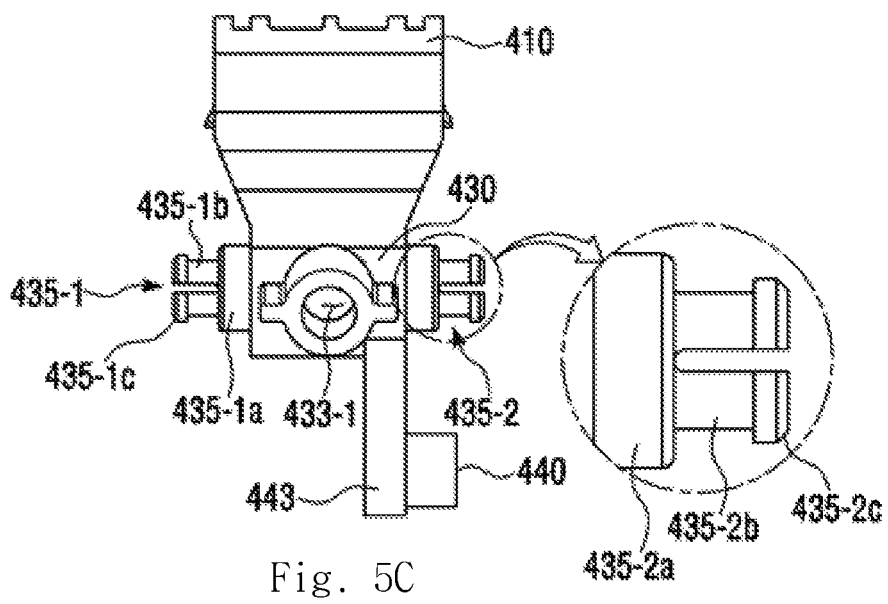
Figure 6A:
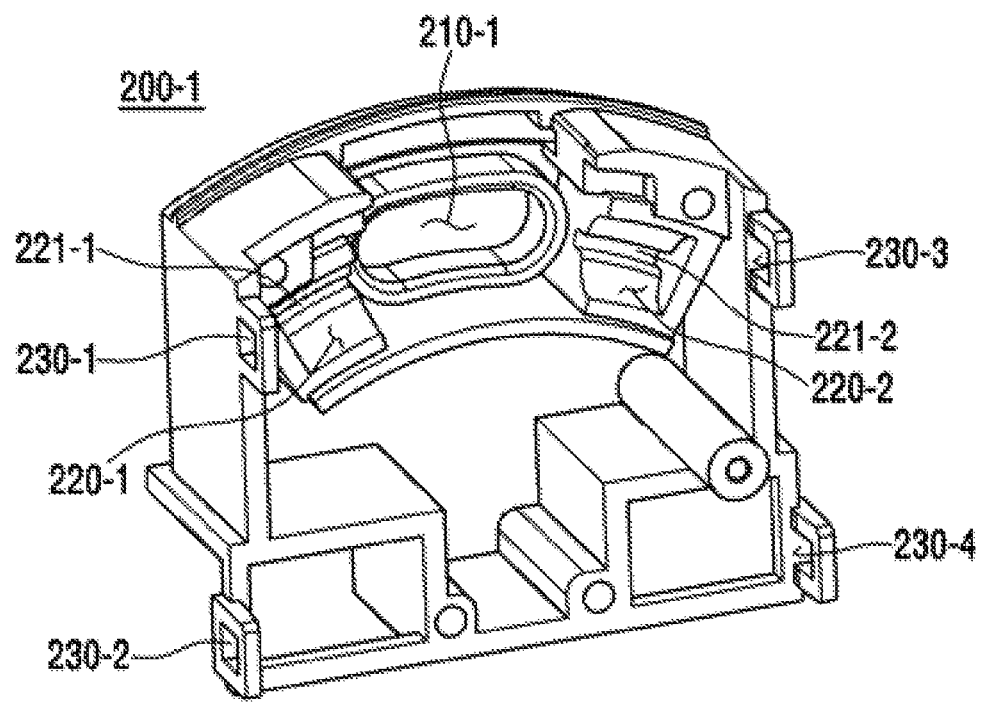
FIGS. 6A and 6B are views showing a bracket shown in FIG. 2 according to an embodiment of the present disclosure.
Figure 6B:
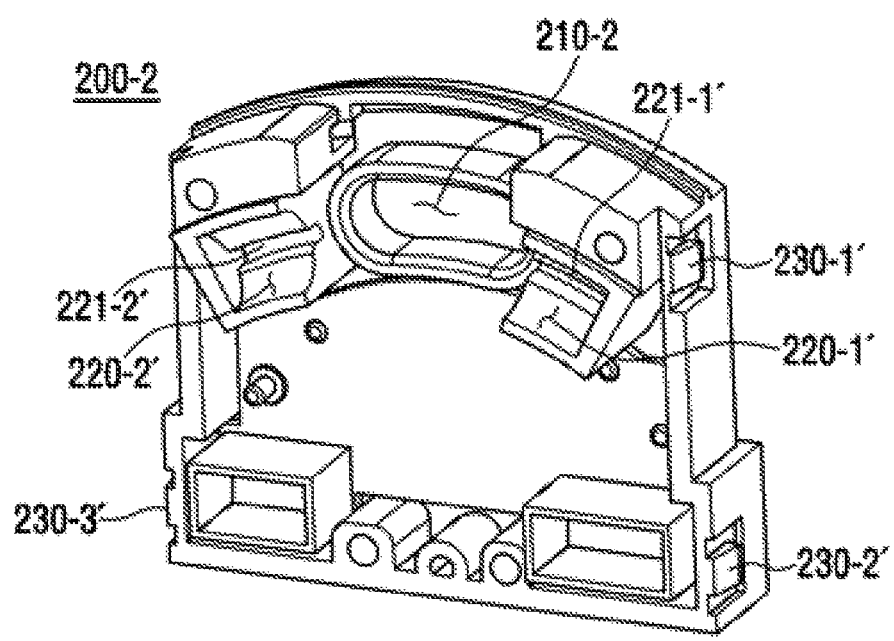

FIG. 4 is a view showing a shift body assembly and the shift slider shown in FIG. 2. FIG. 5 is a view showing the shift body shown in FIG. 2. A top perspective view of the shift body is shown in FIG. 5A. A plan view of the shift body as viewed from the top is shown in FIG. 5B. A side view of the shift body as viewed from the side is shown in FIG. 5C. FIG. 6 is a view showing the bracket shown in FIG. 2. A first bracket is shown in FIG. 6A. A second bracket is shown in FIG. 6B.

Referring to FIGS. 4 to 6, the shift body 400 is disposed under the shift slider 300 and is able to move according to the movement of the shift slider 300.

The shift body 400 may include the shift slider contacting part 410, a bullet seating part 420, a hinge 430, and a magnet seating part 440. According to the embodiment of the present disclosure, the shift slider contacting part 410, the bullet seating part 420, the hinge 430, and the magnet seating part 440 may be integrally formed or may be separately manufactured and connected to each other.

The shift slider contacting part 410 may contact the shift slider 300. Specifically, since the operation part 310 of the shift slider 300 is formed to protrude from the center of the circular arc shape, the groove 313 may be formed in the bottom surface of the operation part 310. The shift slider contacting part 410 may be inserted into and contact the groove 313. When the user pushes or pulls the operation part 310 in the shift direction, the shift slider contacting part 410 move accordingly, so that the shift body 400 moves.

The shift slider contacting part 410 may have a shape corresponding to the groove 313 formed in the bottom surface of the operation part 310. Specifically, when the shift slider contacting part 410 has a cylindrical shape or a polygonal pillar shape, the groove 313 formed in the bottom surface of the operation part 310 may be formed to have a shape receiving the cylindrical shape or polygonal pillar shape of the shift slider contacting part 410. However, the shape of the shift slider contacting part 410 is not limited to this. The shape of the shift slider contacting part 410 can be variously determined in such a way that the user can easily operate the operation part 310.

The length of the shift slider contacting part 410 which is inserted into the groove 313 formed in the bottom surface of the operation part 310 can be properly adjusted. If the shift slider contacting part 410 has a t length that is too long, when the user pushes or pulls the operation part 310, the shift slider contacting part 410 is caught in the inside of the groove 313 formed in the bottom surface of the operation part 310, and thus, the movement of the shift slider 300 may be limited. Therefore, the length of the shift slider contacting part 410 which is inserted into the groove 313 formed in the bottom surface of the operation part 310 can be properly adjusted in conformity with the depth of the groove 313 formed in the bottom surface of the operation part 310 such that the user can move smoothly move the shift slider 300.

The bullet seating part 420 may be formed under the shift slider contacting part 410 in a direction perpendicular to the shift direction. The bullet seating part 420 may be a hole formed under the shift slider contacting part 410 in the direction perpendicular to the shift direction.

A below-described bullet elastic member 530 and a below-described bullet 520 may be disposed in the bullet seating part 420. When the bullet seating part 420 is a hole formed in the shift body 400 in the direction perpendicular to the shift direction, the bullet elastic member 530 may be disposed in the middle of the bullet seating part 420, and the bullet 520 may be disposed on one side and the other side of the bullet elastic member 530 respectively. The bullet 520 can be elastically supported by the bullet elastic member 530.

According to the embodiment of the present disclosure, the bullet seating part 420 may be a hole formed in one side surface and the other side surface (opposite side to the one side surface) of the shift body 400 respectively in the direction perpendicular to the shift direction. The bullet elastic member 530 may be disposed inside each of the holes, and the bullet 520 may be disposed outside the hole. The bullet 520 can be elastically supported by the bullet elastic member 530.

The shape of the bullet seating part 420 may correspond to the shape of the bullet 520. The bullet seating part 420 generally has a cylindrical shape. Also, the bullet seating part 420 may have various shapes including a polygonal tubular shape, etc.

The hinge 430 may be formed under the bullet seating part 420 and may include a plurality of elastic member receiving grooves 433 and a plurality of hinge protrusions 435.

A plurality of the elastic member receiving grooves 433-1 and 433-2 may be formed to protrude or extend from a first side surface and a second side surface of the hinge 430 respectively in the shift direction. Here, the second side surface is opposite to the first side surface.

The elastic member receiving grooves 433-1 and 433-2 may be formed to outwardly protrude or extend from the first side surface and the second side surface respectively.

When the user pushes or pulls the operation part 310 in the shift direction, the shift slider contacting part 410 also moves accordingly, so that the shift body 400 moves. Therefore, the elastic member receiving grooves 433 may be formed in the form of a circular arc in order that the shift body 400 moves smoothly. However, the shape of the elastic member receiving groove 433 is not limited to this. The shape of the elastic member receiving groove 433 can be variously determined in such a way that the user can easily operate the shift slider 300 and the shift body 400.

The elastic member receiving groove 433 may be arranged in a below-described guide recess 220 formed in one side surface and the other side surface of the bracket 200 respectively. The guide recess 220 is formed such that the guide recess 220 receives the elastic member receiving groove 433 to enable the elastic member receiving groove 433 to move. The guide recess 220 may have a shape corresponding to that of the elastic member receiving groove 433 such that the elastic member receiving groove 433 can move.

A guide protrusion 434 may be formed in a long shape on one side and/or the other side of the elastic member receiving groove 433 in the longitudinal direction of the elastic member receiving groove 433. The guide protrusion 434 may protrude outwardly from one side surface and/or the other side surface of the elastic member receiving groove 433.

The guide protrusion 434 may be seated on a guide protrusion groove 221 of the guide recess 220, which is formed in one side surface and the other side surface of the bracket 200 respectively, and move. When the shift body 400 moves in the shift direction by the operation of the user, the guide protrusion 434 can serve as a guide so as to cause the elastic member receiving groove 433 to move without being separated from the guide recess 220.

A hinge elastic member 460 supporting the shift body 400 may be arranged in the elastic member receiving groove 433. After the shift slider 300 moves in the shift direction and the shift stage is changed, the shift slider 300 can return to a reference position by the elastic restoring force of the hinge elastic member 460. The reference position refers to a position where the below-described bullet 520 is received in contact with one catching recess 511 located in the middle among a plurality of catching recesses 511, 512, and 513 of a groove 510.

The hinge elastic member 460 may be an elastic body such as a spring. The hinge elastic member 460 has elasticity which intends to cause the hinge elastic member 460 to return its original shape when an external force is removed from the hinge elastic member 460 deformed by the external force.

When the user pushes or pulls the operation part 310 of the shift slider 300 in the shift direction, the shift body 400 moves accordingly. The shift body 400 which has moved moves to the reference position by the elastic restoring force of the hinge elastic member 460 when the user releases his/her hand from the operation part 310. Here, the shift slider 300 disposed on the shift body 400 moves to the reference position as well.

The hinge elastic member 460 is disposed in the elastic member receiving groove 433 and in the below-described guide recess 220 of the bracket 200. One end of the hinge elastic member 460 is disposed within the elastic member receiving groove 433 and contacts one end portion of the elastic member receiving groove 433. The other end of the hinge elastic member 460 is disposed outside the elastic member receiving groove 433 and contacts one end portion of the guide recess 220.

The shift body 400 may include the hinge 430. The hinge 430 may include not only the plurality of elastic member receiving grooves 433 but also the plurality of hinge protrusions 435.

The plurality of hinge protrusions 435-1 and 435-2 may be formed to protrude or extend from a third side surface and a fourth side surface of the hinge 430 respectively in the direction perpendicular to the shift direction. Here, the fourth side surface is opposite to the third side surface.

The elastic member receiving grooves 433-1 and 433-2 may be formed in the first side surface and the second side surface of the hinge 430 respectively, and the hinge protrusions 435-1 and 435-2 may be formed on the third side surface and the fourth side surface of the hinge 430 respectively. The elastic member receiving groove 433 and the hinge protrusion 435 may be formed integrally with the hinge 430 or may be separately manufactured and connected to the hinge 430.

The hinge protrusions 435-1 and 435-2 may be formed to outwardly protrude or extend from the third side surface and the fourth side surface respectively.

The hinge protrusions 435-1 and 435-2 may include hinge protrusion lower portions 435-1a and 435-2a and hinge protrusion upper portions 435-1b and 435-2b.

The hinge protrusion lower portions 435-1a and 435-2a may be formed to outwardly protrude or extend from the third side surface and the fourth side surface of the hinge 430 by a predetermined length respectively, and the hinge protrusion upper portions 435-1b and 435-2b may be formed to outwardly protrude or extend from the hinge protrusion lower portions 435-1a and 435-2a by a predetermined length. The diameter of the portion of the hinge protrusion upper portions 435-1b and 435-2b, which protrudes or extends may be less than the diameter of the portion of the hinge protrusion lower portions 435-1a and 435-2a, which protrudes or extends.

According to the embodiment of the present disclosure, the plurality of hinge protrusion upper portions 435-1b and 435-2b may be provided. The plurality of hinge protrusion upper portions 435-1b and 435-2b may be formed to outwardly protrude or extend by a predetermined length from the hinge protrusion lower portions 435-1a and 435-2a. The plurality of hinge protrusion upper portions 435-1b and 435-2b may be formed to be spaced apart from each other by a predetermined interval.

Also, according to the embodiment of the present disclosure, instead of the plurality of hinge protrusion upper portions 435-1b and 435-2b, the hinge protrusion upper portions 435-1b and 435-2b may be formed as one body. The hinge protrusion upper portions 435-1b and 435-2b may be formed to outwardly protrude or extend from the hinge protrusion lower portions 435-1a and 435-2a by a predetermined length. A groove having a predetermined depth may be formed in the middle portion of the hinge protrusion upper portions 435-1b and 435-2b in a direction in which the hinge protrusion upper portions 435-1b and 435-2b protrude or extend.

A roller 450 may be disposed on the hinge protrusion 435. Specifically, the rollers 450-1 and 450-2 may be disposed on the hinge protrusion upper portions 435-1b and 435-2b.

The rollers 450-1 and 450-2 may have a ring shape and may be disposed on the hinge protrusion upper portions 435-1b and 435-2b and rotate.

Lest the rollers 450-1 and 450-2 should be separated from the hinge protrusion upper portions 435-1b and 435-2b after being fastened to the hinge protrusion upper portions 435-1b and 435-2b, catching portions 435-1c and 435-2c which protrude or extend from an end of the hinge protrusion upper portions 435-1b and 435-2b in a direction perpendicular to the direction in which the hinge protrusion upper portions 435-1b and 435-2b protrude or extend may be formed on the hinge protrusion upper portions 435-1b and 435-2b. When the plurality of hinge protrusion upper portions 435-1b and 435-2b are provided, the catching portions 435-1c and 435-2c may be formed for each of the hinge protrusion upper portions 435-1b and 435-2b.

According to the embodiment of the present disclosure, when the hinge protrusion upper portions 435-1b and 435-2b are formed as one body, the rollers 450-1 and 450-2 may be disposed on the hinge protrusion upper portions 435-1b and 435-2b and rotate. Also, when the plurality of hinge protrusion upper portions 435-1b and 435-2b are provided, the rollers 450-1 and 450-2 may be disposed to surround the hinge protrusion upper portions 435-1b and 435-2b and rotate.

According to the embodiment of the present disclosure, the hinge protrusions 435-1 and 435-2 may be formed only of the above-described hinge protrusion upper portions 435-1b and 435-2b without the above-described hinge protrusion lower portions 435-1a and 435-2a. Specifically, the hinge protrusions 435-1 and 435-2 may be formed of, instead of the above-described hinge protrusion lower portions 435-1a and 435-2a, the above-described hinge protrusion upper portions 435-1b and 435-2b which are formed to outwardly protrude or extend from the third side surface or the fourth side surface of the hinge 430 by a predetermined length respectively.

The hinge protrusion 435 and the roller 450 may be disposed in a below-described hinge protrusion recess 210 of the bracket 200. The hinge protrusion recess 210 may be formed such that the hinge protrusion 435 and the roller 450 are movable.

When the user pushes or pulls the operation part 310 of the shift slider 300 in the shift direction, the shift body 400 disposed under the shift slider 300 moves accordingly. Here, the hinge protrusion 435 and the roller 450 disposed in the hinge protrusion recess 210 moves along the hinge protrusion recess 210. Since the roller 450 is disposed on the hinge protrusion 435 and rotates, the shift body 400 moves smoothly.

The shift slider 300 is located at a predetermined reference position. When the shift slider 300 moves from the reference position in the shift direction in accordance with the operation of the user, the hinge protrusion 435 moves along the hinge protrusion recess 210, and then the shift stage is changed. The shift slider 300 which has moved in the shift direction can return to the reference position by the elastic restoring force of the hinge elastic member.

The magnet seating part 440 may be formed in the lower portion of the hinge 430. The magnet seating part 440 may be formed on one side of a protrusion 443 which protrudes or extends downward from the hinge 430. In other words, the magnet seating part 440 may be formed on one side of the protrusion 443 which protrudes or extends downward from the hinge 430 in the opposite direction of the shift slider contacting part 410.

The magnet seating part 440 may be a hole or a concave groove formed on one side of the protrusion 443 which protrudes or extends downward from the hinge 430. Here, the hole or the groove may be formed in the direction perpendicular to the shift direction. The shapes of the groove and the hole are not specially determined. The groove and the hole may have various shapes.

A below-described magnet 600 is disposed in the magnet seating part 440. The magnet 600 generates a magnetic field.

When the user pushes or pulls the operation part 310 of the shift slider 300 in the shift direction, the shift body 400 moves accordingly. Therefore, the magnet 600 disposed in the magnet seating part 440 moves as well. The magnetic field generated by the magnet 600 is sensed by a below-described sensor. The sensor changes the output signal in accordance with the change of the sensed magnetic field and transmits it to a controller. The controller changes the shift stage to a shift stage corresponding to the output signal.

<Bracket 200>

Referring back to FIGS. 6A and 6B, the bracket 200 may be arranged under the shift slider 300 and may receive the shift body 400.

The bracket 200 may include a first bracket 200-1 and a second bracket 200-2 and may be formed by coupling the first bracket 200-1 and the second bracket 200-2. A plurality of catching holes 230-1, 230-2, 230-3, and 230-4 may be formed at the edge of the first bracket 200-1, and a plurality of catching projections 230-1', 230-2', 230-3', and 230-4' may be formed at the edge of the second bracket 200-2. The plurality of catching holes 230-1, 230-2, 230-3, and 230-4 and the plurality of catching projections 230-1', 230-2', 230-3', and 230-4' can be fastened and coupled to each other.

The bracket 200 may include the hinge protrusion recess 210 and the guide recess 220. Also, the bracket 200 may receive the below-described groove 510.

The hinge protrusion recess 210 may receive the hinge protrusion 435 and the roller 450. The hinge protrusion 435 and the roller 450 may be disposed in the hinge protrusion recess 210.

The hinge protrusion recess 210 may be formed in one side surface and the other side surface of the bracket 200 respectively. Here, the one side surface of the bracket 200 may be one side surface of the first bracket 200-1, and the other side surface of the bracket 200 may be one side surface of the second bracket 200-2. That is to say, the bracket 200 may be formed by coupling the first bracket 200-1 and the second bracket 200-2, and the hinge protrusion recesses 210-1 and 210-2 may be formed in the one side surface of the first bracket 200-1 and in the one side surface of the second bracket 200-2 respectively. Also, the hinge protrusions 435-1 and 435-2 and the rollers 450-1 and 450-2 may be disposed in the hinge protrusion recesses 210-1 and 210-2 respectively.

The hinge protrusion recess 210 may be formed to enable the hinge protrusion 435 and the roller 450 to move. When the user pushes or pulls the operation part 310 of the shift slider 300 in the shift direction, the shift body 400 moves accordingly. Here, the hinge protrusion 435 and the roller 450 are disposed in the hinge protrusion recess 210 and moves along the hinge protrusion recess 210. Since the roller 450 is disposed on the hinge protrusion 435 and rotates in the hinge protrusion recess 210, the hinge protrusion 435 may be formed to have a shape allowing the roller 450 to rotate smoothly. Also, the hinge protrusion recess 210 may be formed to have a predetermined length by distances that the hinge protrusion 435 and the roller 450 move.

The guide recess 220 may be formed in one side surface and the other side surface of the bracket 200 respectively. The guide recess 220 can receive the elastic member receiving groove 433 and the hinge elastic member 460. Here, the one side surface of the bracket 200 may be one side surface of the first bracket 200-1, and the other side surface of the bracket 200 may be one side surface of the second bracket 200-2. That is to say, the bracket 200 may be formed by coupling the first bracket 200-1 and the second bracket 200-2, and the guide recesses 220-1, 220-1', 220-2, and 220-2' may be formed in the one side surface of the first bracket 200-1 and in the one side surface of the second bracket 200-2 respectively. Also, the elastic member receiving grooves 433-1 and 433-2 and the hinge elastic members 460-1 and 460-2 may be disposed in the guide recesses 220-1, 220-1', 220-2, and 220-2' respectively.

The guide recess 220 may be formed to enable the elastic member receiving groove 433 to move. The guide recess 220 may have a shape corresponding to the elastic member receiving groove 433 such that the elastic member receiving groove 433 can move.

When the user pushes or pulls the operation part 310 of the shift slider 300 in the shift direction, the shift body 400 moves accordingly. Here, the elastic member receiving groove 433 moves along the guide recess 220. Since the elastic member receiving groove 433 moves in the guide recess 220, the guide recess 220 may be formed to have a shape allowing the elastic member receiving groove 433 to move smoothly. Also, the guide recess 220 may be formed to have a predetermined length by a distance that the elastic member receiving groove 433 moves.

The guide protrusion grooves 221-1, 221-1', 221-2, 221-2' may be formed in the guide recesses 220-1, 220-1', 220-2, and 220-2'. The guide protrusion grooves 221-1, 221-1', 221-2, 221-2' may be formed in the guide recesses 220-1, 220-1', 220-2, and 220-2' in a long shape in the longitudinal direction of the guide recess. The guide protrusions 434-1, 434-2, 434-1', and 434-2' formed in the elastic member receiving grooves 433-1 and 433-2 may be seated and move in the guide protrusion grooves 221-1, 221-1', 221-2, and 221-2'.

The bracket 200 can receive the below-described groove 510. The groove 510 may be fixedly disposed on one upper side surface and the other upper side surface of the bracket 200. Here, the one upper side surface of the bracket 200 may be one upper side surface of the first bracket 200-1, and the other upper side surface of the bracket 200 may be one upper side surface of the second bracket 200-2. In other words, the bracket 200 may be formed by coupling the first bracket 200-1 and the second bracket 200-2, and the grooves 510-1 and 510-2 may be disposed on the one upper side surface of the first bracket 200-1 and the one upper side surface of the second bracket 200-2 respectively.

The one upper side surface of the first bracket 200-1 and the one upper side surface of the second bracket 200-2 may have various shapes allowing the grooves 510-1 and 510-2 to be disposed thereon. A variety of components can be additionally disposed as well.

<Detent System 500>

Figure 9:
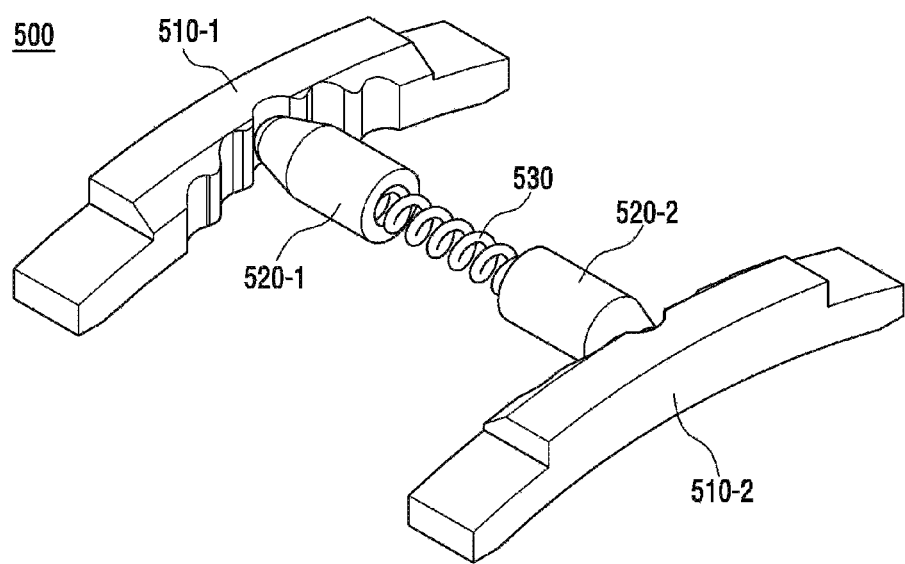
FIG. 9 is a view showing the arrangement of the bullet, the bullet elastic member, and the groove shown in FIG. 4 according to an embodiment of the present disclosure.

FIG. 7 is a view showing the arrangement of the bullet and the bullet elastic member shown in FIG. 4. FIGS. 8A and 8B are views showing the groove shown in FIG. 4. FIG. 9 is a view showing the arrangement of the bullet, the bullet elastic member, and the groove shown in FIG. 4.

Referring to FIGS. 7 to 9, the detent system 500 may include the bullet elastic member 530, the bullet 520, and the groove 510.

The bullet elastic member 530 may be disposed in the bullet seating part 420.

The bullet elastic member 530 may be an elastic body such as a spring. The bullet elastic member 530 has elasticity which intends to cause the hinge elastic member 460 to return its original shape when an external force is removed from the hinge elastic member 460 deformed by the external force.

The bullets 520-1 and 520-2 may be disposed on one side and the other side of the bullet elastic member 530. The bullet elastic member 530 can elastically support the bullet 520.

When the user pushes or pulls the operation part 310 of the shift slider 300 in the shift direction, the bullet 520 moves into contact with the catching recesses 511, 512, and 513 of the groove 510 and with projections 514 and 515 formed between the catching recesses 511, 512, and 513. Here, the bullet elastic member 530 contracts and relaxes (restores) by the depths h1, h2, and h3 of the catching recesses 511, 512, and 513 or by the depths h4 and h5 of the projections 514 and 515, thereby elastically supporting the bullet 520. The contraction and relaxation (restoration) of the bullet elastic member 530 can provide the user with gear shift distinction feeling.

After the shift stage is changed by moving the shift slider 300 in the shift direction, the shift slider 300 can return to the reference position by the elastic restoring force of the bullet elastic member 530. In other words, when the user pushes or pulls the operation part 310 of the shift slider 300 in the shift direction, the shift body 400 moves accordingly. When the user releases his/her hand from the operation part 310, the bullet 520 moves to the reference position by the elastic restoring force of the bullet elastic member 530, and thus, the shift body 400 moves to the reference position as well. Here, the shift slider 300 disposed on the shift body 400 also moves to the reference position. Here, the reference position refers to a position where the below-described bullet 520 is received in contact with one catching recess 511 located in the middle among the plurality of catching recesses 511, 512, and 513 of the groove 510.

The force causing the shift slider 300 and the shift body 400 to return to the reference position is generated by the bullet elastic member 530 and the hinge elastic member 460. By using the bullet elastic member 530 and the hinge elastic member 460 together, the shift slider 300 and the shift body 400 can be effectively caused to return to the reference position when the user pushes or pulls the operation part 310 of the shift slider 300 in the shift direction.

The bullet 520 may be seated in bullet seating part 420. One side of the bullet 520 may be disposed to protrude from the bullet seating part 420. The bullet 520 may be disposed on one side and the other side of the bullet elastic member 530 respectively and can be elastically supported by the bullet elastic member 530.

The one side of the bullet 520 may contact with the catching recesses 511, 512, and 513 of the groove 510 and with the projections 514 and 515 formed between the catching recesses 511, 512, and 513. The other side of the bullet 520 may contact the bullet elastic member 530. Since the one side of the bullet 520 moves into contact with the catching recesses 511, 512, and 513 of the groove 510 and with the projections 514 and 515 formed between the catching recesses 511, 512, and 513, the one side of the bullet 520 may be formed to have a spherical shape.

The grooves 510-1 and 510-2 may be fixedly arranged in one upper side surface and the other upper side surface of the bracket 200 respectively, and the bullet 520 may contact the grooves 510-1 and 510-2. Specifically, one surface of the groove 510 may include the plurality of catching recesses 511, 512, and 513 and the projections 514 and 515 formed between the plurality of catching recesses 511, 512, and 513. The one side of the bullet 520 may contact with the one surface of the groove 510 where the plurality of catching recesses 511, 512, and 513 and the projections 514 and 515 have been formed.

The depths h1, h2, and h3 of the plurality of catching recesses 511, 512, and 513 increase toward the middle from the edge. Here, the depths h1, h2, and h3 of the catching recess refer to a distance from one surface of the groove 510 to the lowest point of the catching recesses 511, 512, and 513.

The catching recess 511 which is located in the middle among the plurality of catching recesses 511, 512, and 513 has a depth greater than that of the catching recess 513 located at the edge. The depth of the catching recess increases from the catching recess 513 located at the edge toward the catching recess 511 located in the middle. This is for the purpose of enabling the shift slider 300 to return to the reference position by the elastic restoring force of the bullet elastic member 530 after the shift stage is changed by moving the shift slider 300 in the shift direction.

When the bullet 520 contacts with the catching recess 511 located in the middle, the length of the bullet elastic member 530 is the least changed and the bullet elastic member 530 has the smallest elastic restoring force. When the bullet 520 moves and contacts with the catching recess 513 located at the edge, the length of the bullet elastic member 530 is the most changed and the bullet elastic member 530 has the greatest elastic restoring force. Therefore, the bullet 520 contacting with the catching recess 513 located at the edge moves to the catching recess 512 located next to the catching recess 513 by the elastic restoring force of the bullet elastic member 530. By this principle, even when the user releases his/her hand from the operation part 310 after pushing or pulling the operation part 310 of the shift slider 300 in the shift direction, the shift slider 300 is able to return to the reference position.

Briefly summarizing the functions of the detent system 500, when the bullet 520 moves into the contact with the plurality of catching recesses 511, 512, and 513 formed in one surface of the groove 510 and the projections 514 and 515 formed between the catching recesses 511, 512, and 513, the user can obtain the gear shift distinction feeling. Also, the depths of the plurality of catching recesses 511, 512, and 513 increase toward the middle 511 from the edge 513. Therefore, even though the user moves the shift slider 300 in the shift direction, the shift slider 300 can return to the reference position by the elastic restoring force of the bullet elastic member 530.

According to the embodiment of the present disclosure, the depths h1, h2, and h3 of the plurality of catching recesses 511, 512, and 513 may be constant toward the middle 511 from the edge 513. Here, the depths h1, h2, and h3 of the catching recess refer to a distance from one surface of the groove 510 to the lowest point of the catching recesses 511, 512, and 513. When the depths h1, h2, and h3 of the plurality of catching recesses 511, 512, and 513 are constant, the detent system 500 would provide the user with only the gear shift distinction feeling, and the shift slider 300 would return to the reference position only by the elastic restoring force of the hinge elastic member 460.

According to the embodiment of the present disclosure, the plurality of catching recesses 511, 512, and 513 formed in one surface of the groove 510 may have a spherical shape respectively. The plurality of catching recesses 511, 512, and 513 may have an inwardly concave spherical shape such that one side of the bullet 520 can move smoothly. To minimize the damage of the groove 510 and the bullet 520 due to friction, the plurality of catching recesses 511, 512, and 513 and one side of the bullet 520 may be formed to correspond to each other.

<Shift Stage Sensor>

Referring back to FIG. 4, the shift stage sensor may include the magnet 600 and a sensor (not shown).

The magnet 600 is disposed in the magnet seating part 440 and generates a magnetic field.

The magnet 600 may have a shape corresponding to the shape of the magnet seating part 440. However, the shape of the magnet 600 is not limited to this. The magnet 600 may have various shapes.

The sensor can sense the magnetic field generated by the magnet 600. The sensor may be disposed within the lower side surface of the bracket 200 in such a manner as to correspond to the magnet 600. A substrate may be disposed within the lower side surface of the bracket 200. The sensor may be disposed on the substrate.

As long as the sensor can sense the magnetic field generated by the magnet 600, the sensor can be disposed anywhere within the bracket 200. In the case where the sensor is disposed on the substrate, if the sensor can sense the magnetic field of the magnet 600, the substrate can be disposed anywhere within the bracket 200.

When the user pushes or pulls the operation part 310 of the shift slider 300 in the shift direction, the shift body 400 moves accordingly. Therefore, the magnet 600 disposed in the magnet seating part 440 of the shift body 400 moves as well. As the magnet 600 moves, the strength of the magnetic field sensed by the sensor changes. The sensor changes the output signal in accordance with the change of the sensed magnetic field and transmits it to the controller. The controller may change the shift stage to a shift stage corresponding to the output signal.

Figure 10A:
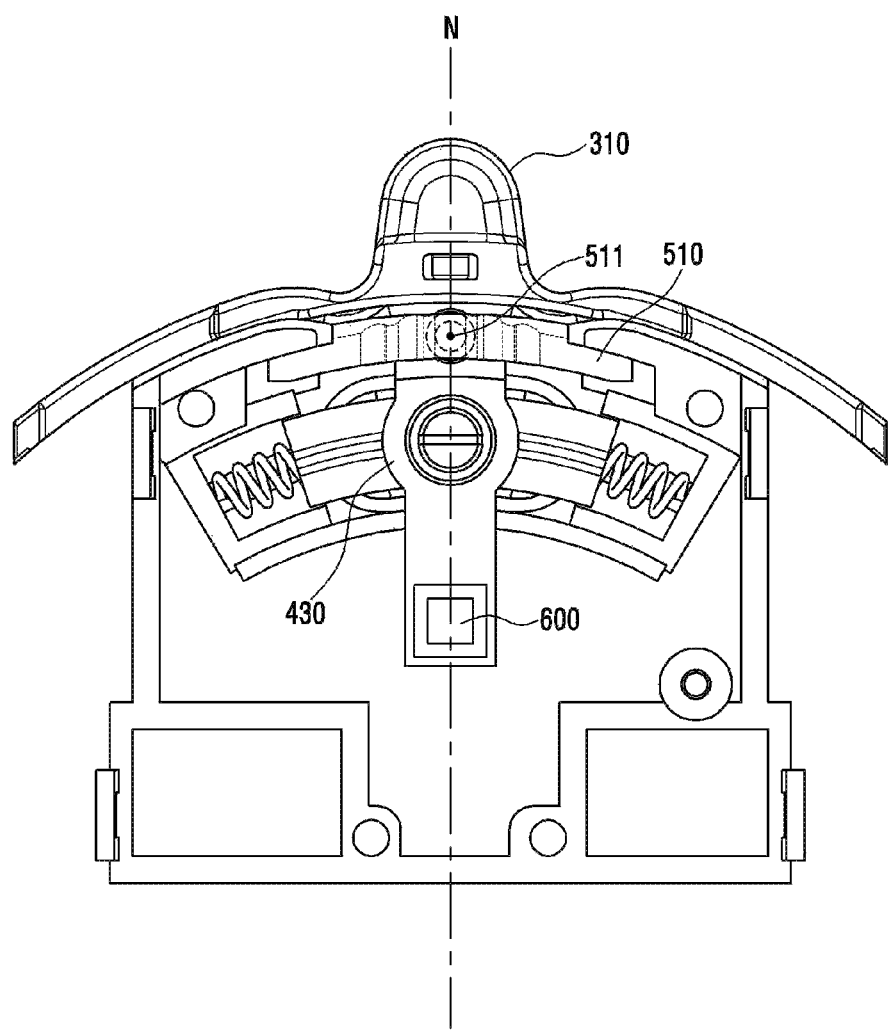
FIGS. 10A to 10C are views for describing the operation principle of the shift slider according to the embodiment of the present disclosure.
Figure 10B:
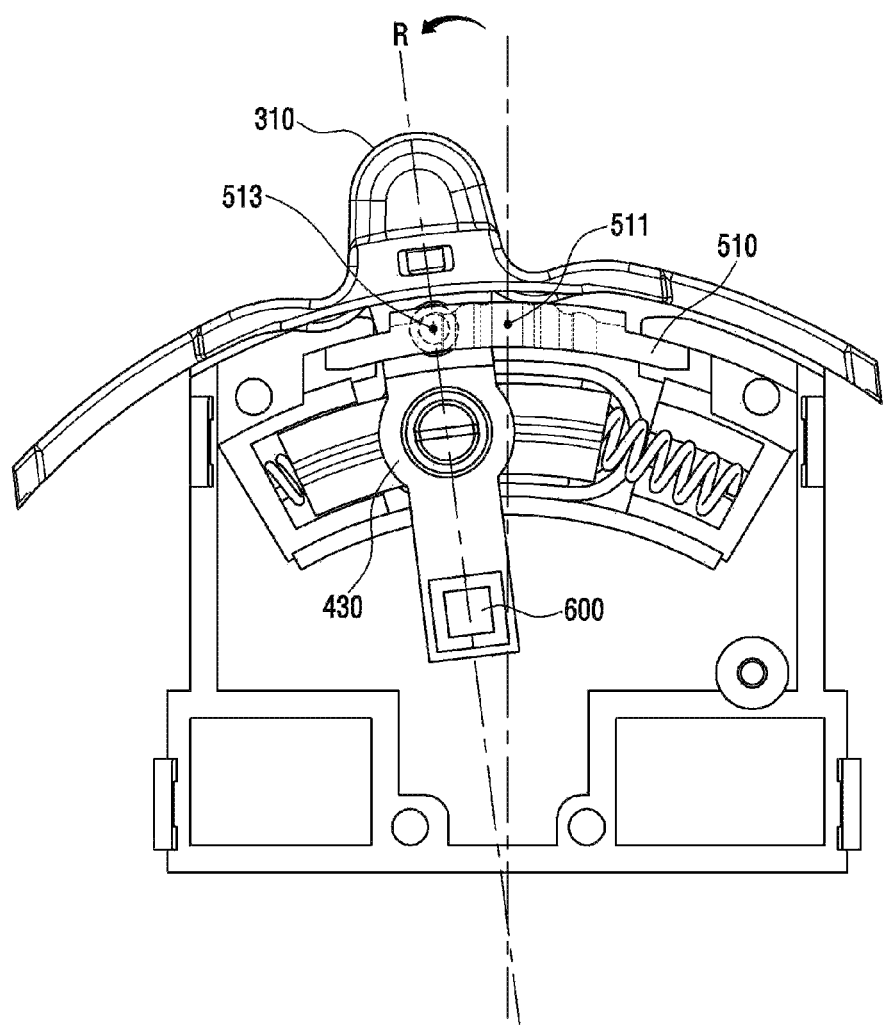
Figure 10C:
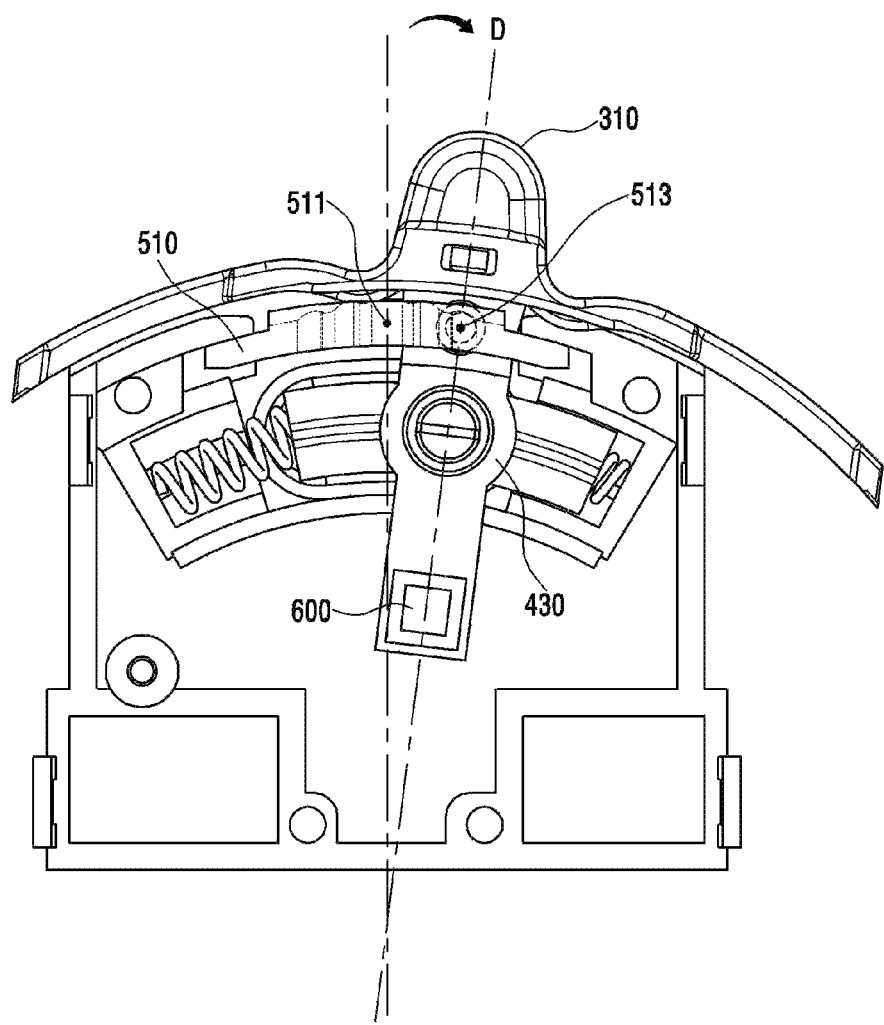

FIGS. 10A to 10C are views for describing the operation principle of the shift slider according to the embodiment of the present disclosure.

Referring to FIG. 10A, when the shift slider 300 is in the neutral state (N), in a state where the shift body 400 does not move, the bullets 520-1 and 520-2 may contact with and be received in the catching recess 511 located in the middle among the plurality of catching recesses 511, 512, and 513 of each of the grooves 510-1 and 510-2.

Referring to FIG. 10B, when the user pushes the operation part 310 of the shift slider 300 in the shift direction in the neutral state, the shift body 400 rotates counterclockwise in the neutral state and the bullets 520-1 and 520-2 moves from the catching recess 511 located in the middle of each of the grooves 510-1 and 510-2 to the catching recess 513 located at the edge and is received in the catching recess 513. As a result, the shift stage R is selected. Then, the bullets 520-1 and 520-2 returns to the catching recess 511 located in the middle by the elastic restoring forces of the bullet elastic member 530 and the hinge elastic member 460, so that the shift slider 300 can be located in the middle. Here, even though the shift slider 300 is located in the middle, the shift stage is changed to the shift stage R.

Referring to FIG. 10C, when the user pulls the operation part 310 of the shift slider 300 in the shift direction in the neutral state, the shift body 400 rotates clockwise in the neutral state and the bullets 520-1 and 520-2 moves from the catching recess 511 located in the middle of each of the grooves 510-1 and 510-2 to the catching recess 513 located at the edge and is received in the catching recess 513. As a result, the shift stage D is selected. Then, the bullets 520-1 and 520-2 returns to the catching recess 511 located in the middle by the elastic restoring forces of the bullet elastic member 530 and the hinge elastic member 460, so that the shift slider 300 can be located in the middle. Here, even though the shift slider 300 is located in the middle, the shift stage is changed to the shift stage D.

By the operation of the shift slider 300, the bullets 520-1 and 520-2 moves from the catching recess 511 located in the middle of the grooves 510-1 and 510-2 to the catching recess 513 located at the edge. As a result, the user can obtain the gear shift distinction feeling.

Figure 11:
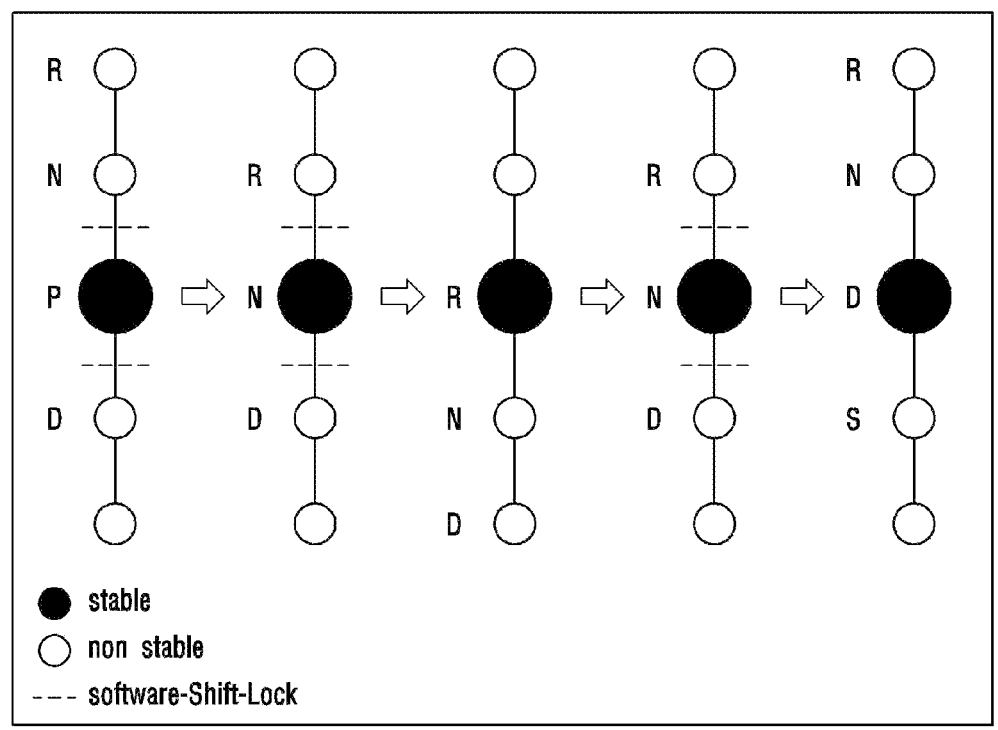
FIG. 11 is a view for describing the change principle of a shift stage according to the embodiment of the present invention.

FIG. 11 is a view for describing the change principle of the shift stage according to the embodiment of the present invention.

Referring to FIGS. 2A and 11, a P shift stage button 700 is disposed within the housing 100. Further, the P shift stage button 700 may be disposed around the driver's seat within the vehicle. Describing the case where the shift stage is changed to the shift stage P, if the user presses the P shift stage button 700, the shift stage can be changed from any one of shift stages R, N, and D to the shift stage P, irrespective of the shift slider 300.

When the user pushes (moves forward) the operation part 310 of the shift slider 300 in the shift direction in the state where the shift stage is the shift stage N, the shift stage is changed to the shift stage R. When the user releases his/her hand from the operation part 310, the shift slider 300 can return to the original reference position.

When the user pulls (moves backward) the operation part 310 of the shift slider 300 in the shift direction in the state where the shift stage is the shift stage R, the shift stage is changed to the shift stage N. When the user releases his/her hand from the operation part 310, the shift slider 300 can return to the original reference position.

When the user pulls (moves backward) the operation part 310 of the shift slider 300 in the shift direction in the state where the shift stage is the shift stage N, the shift stage is changed to the shift stage D. When the user releases his/her hand from the operation part 310, the shift slider 300 can return to the original reference position.

According to the embodiment of the present disclosure, the user can change the shift stage by pushing or pulling (moving forward or backward). In this case, the shift slider 300 can maintain the reference position.

The electronic shift control device according to the embodiment of the present invention is small and has excellent space utilization Since a smaller number of parts constitute the shift control device, the electronic shift control device is light. Also, the shift control device is simply assembled by simplifying the configuration of the parts.

Also, the electronic shift control device has a small number of parts, and thus, the manufacturing cost thereof can be reduced. Also, the shift control device is simply assembled, and thus, the manufacturing time thereof can be reduced.

Also, the user can select the shift stage only by means of simple operation.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. An electronic shift control device comprising:
    a shift slider which is movable in a shift direction by an operation of a user;
    a shift body which is arranged under the shift slider and is movable according to movement of the shift slider; and
    a bracket which is arranged under the shift slider and receives the shift body,
        wherein the shift body comprises a plurality of elastic member receiving grooves and a plurality of hinge protrusions,
        wherein a hinge elastic member supporting the shift body is arranged in the elastic member receiving groove,
        wherein the bracket comprises a hinge protrusion recess receiving the hinge protrusion,
        wherein the shift slider is located at a predetermined reference position, and wherein, when the shift slider moves from the reference position in the shift direction in accordance with the operation of the user, the hinge protrusion moves along the hinge protrusion recess, and then a shift stage is changed, and the shift slider which has moved in the shift direction returns to the reference position by an elastic restoring force of the hinge elastic member,
    wherein the shift body comprises:
        a shift slider contacting part which contacts the shift slider;
        a bullet seating part which is formed under the shift slider contacting part in a direction perpendicular to the shift direction;
        a hinge which is formed under the bullet seating part and comprises the plurality of elastic member receiving grooves and the plurality of hinge protrusions; and
        a magnet seating part which is formed in a lower portion of the hinge.

2. The electronic shift control device of claim 1, further comprising a detent system,
    wherein the detent system comprises:
        a bullet elastic member which is disposed in the bullet seating part;

a bullet which is disposed on one side and another side of the bullet elastic member respectively and is elastically supported by the bullet elastic member; and a groove which is fixedly arranged in one upper side surface and the other upper side surface of the bracket respectively and which the bullet contacts, and wherein the shift slider returns to the reference position by an elastic restoring force of the bullet elastic member after the shift stage is changed by moving the shift slider in the shift direction.

3. The electronic shift control device of claim 2, wherein one surface of the groove comprises a plurality of catching recesses and projections formed between the plurality of catching recesses, wherein depths of the plurality of catching recesses increase toward a middle from an edge thereof, and wherein a depth of the catching recess is a distance from the one surface of the groove to a lowest point of the catching recess.

4. The electronic shift control device of claim 2, wherein the reference position is a position where the bullet is received in contact with one catching recess located in a middle among the plurality of catching recesses.

5. The electronic shift control device of claim 1, wherein the plurality of elastic member receiving grooves are formed to protrude or extend from a first side surface and a second side surface of the hinge respectively in the shift direction, and wherein the second side surface is opposite to the first side surface.

6. The electronic shift control device of claim 1, wherein the bracket further comprises a guide recess formed in one side surface and another side surface of the bracket respectively, and wherein the guide recess is formed such that the guide recess receives the elastic member receiving groove to enable the elastic member receiving groove to move.

7. The electronic shift control device of claim 1, further comprising a shift stage sensor, wherein the shift stage sensor comprises:

a magnet which is disposed in the magnet seating part; and a sensor which senses a magnetic field of the magnet and is disposed within a lower side surface of the bracket in such a manner as to correspond to the magnet.

8. The electronic shift control device of claim 1, wherein the plurality of hinge protrusions are formed to protrude or extend from a third side surface and a fourth side surface of the hinge respectively in the direction perpendicular to the shift direction, and wherein the fourth side surface is opposite to the third side surface.

9. The electronic shift control device of claim 8, wherein a roller is disposed on the hinge protrusion, and wherein the roller is disposed in a hinge protrusion recess.

10. The electronic shift control device of claim 1, wherein the hinge protrusion recess is formed in one side surface and another side surface of the bracket respectively and is formed to enable the hinge protrusion to move.

* * * * *